US009619836B2

(12) United States Patent
Okamura

(10) Patent No.: US 9,619,836 B2
(45) Date of Patent: Apr. 11, 2017

(54) RECOGNITION DICTIONARY EVALUATION APPARATUS AND RECOGNITION DICTIONARY EVALUATION METHOD

(71) Applicant: TOSHIBA TEC KABUSHIKI KAISHA, Shinagawa-ku, Tokyo (JP)

(72) Inventor: Atsushi Okamura, Iwanuma (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 14/330,104

(22) Filed: Jul. 14, 2014

(65) Prior Publication Data
US 2015/0023598 A1 Jan. 22, 2015

(30) Foreign Application Priority Data

Jul. 17, 2013 (JP) .................................. 2013-148548

(51) Int. Cl.
G06K 9/62 (2006.01)
G06Q 30/06 (2012.01)
(52) U.S. Cl.
CPC ....... *G06Q 30/0643* (2013.01); *G06K 9/6255* (2013.01); *G06K 2209/17* (2013.01)
(58) Field of Classification Search
CPC .......... G06K 2209/17; G06K 9/00201; G06K 9/00671; G06N 99/005; G06T 2207/30128; G06T 7/0004

(Continued)

(56) References Cited

U.S. PATENT DOCUMENTS 5,602,938 A 2/1997 Akiyama et al.
6,201,885 B1 * 3/2001 Hodgson ................ G01B 11/28
209/576

(Continued)

FOREIGN PATENT DOCUMENTS

JP 03-180897 8/1991
JP 07-49951 2/1995

(Continued)

OTHER PUBLICATIONS

First Office Action for Japanese Patent Application No. 2013-148548 dated Jun. 23, 2015, 5 pages.

*Primary Examiner* — Siamak Harandi
*Assistant Examiner* — Shaghayegh Azima
(74) *Attorney, Agent, or Firm* — Amin, Turocy & Watson LLP

(57) ABSTRACT

In accordance with one embodiment, a recognition dictionary evaluation apparatus calculates, in response to the update of a recognition dictionary file, a recognition rate by item of each commodity according to feature amount data of the updated recognition dictionary file; evaluates the recognition dictionary file based on the calculated recognition rate by item of each commodity; detects, in a case in which the recognition dictionary file is evaluated to be improper, a low recognition commodity of which a correct recognition rate that a commodity is correctly recognized from all commodities is lower than a given level, and an incorrect recognition commodity of which an incorrect recognition rate is high within the recognition rate by item of the low recognition commodity; and notifies the items of the low recognition commodity and the incorrect recognition commodity.

9 Claims, 7 Drawing Sheets

(58) Field of Classification Search
USPC .................................................. 382/181, 103
See application file for complete search history.

(56) References Cited

U.S. PATENT DOCUMENTS

| | | | | |
|---|---|---|---|---|
| 2007/0031010 A1* | 2/2007 | Sukegawa | ............ | G06K 9/6255 |
| | | | | 382/118 |
| 2012/0047037 A1* | 2/2012 | Ueda | ........................ | G06K 9/00 |
| | | | | 705/23 |
| 2012/0243779 A1* | 9/2012 | Nakai | ................... | G06K 9/6256 |
| | | | | 382/159 |
| 2013/0236053 A1* | 9/2013 | Naito | ..................... | G06K 9/033 |
| | | | | 382/103 |
| 2013/0322700 A1* | 12/2013 | Sugasawa | ............ | G06K 9/6202 |
| | | | | 382/110 |
| 2014/0003727 A1* | 1/2014 | Lortz | ................... | G06Q 10/087 |
| | | | | 382/218 |
| 2014/0052555 A1* | 2/2014 | MacIntosh | ........... | G06Q 20/208 |
| | | | | 705/23 |
| 2014/0126772 A1* | 5/2014 | Miyakoshi | ......... | G06K 9/00671 |
| | | | | 382/103 |
| 2014/0126773 A1* | 5/2014 | Miyakoshi | ............... | G06K 9/00 |
| | | | | 382/103 |

FOREIGN PATENT DOCUMENTS

| | | |
|---|---|---|
| JP | 10-260960 | 9/1998 |
| JP | 11-306357 | 11/1999 |
| JP | 2010-009517 | 1/2010 |
| JP | 2010-237886 | 10/2010 |
| JP | 2012-203634 | 10/2012 |

\* cited by examiner

FIG.9

| 40T-1 | 0011 | APPLE | MANDARIN ORANGE | CUCUMBER |
|---|---|---|---|---|
| | APPLE | 98% | 1% | 2% |
| | MANDARIN ORANGE | 1% | 97% | 2% |
| | CUCUMBER | 1% | 2% | 96% |

FIG.10

| 40T-2 | 0012 | APPLE | MANDARIN ORANGE | CUCUMBER | LEMON |
|---|---|---|---|---|---|
| | APPLE | 97% | 1% | 2% | 2% |
| | MANDARIN ORANGE | 1% | 95% | 2% | 4% |
| | CUCUMBER | 1% | 2% | 95% | 1% |
| | LEMON | 1% | 2% | 1% | 93% |

RECOGNITION DICTIONARY EVALUATION APPARATUS AND RECOGNITION DICTIONARY EVALUATION METHOD

CROSS-REFERENCE TO RELATED APPLICATION

This application is based upon and claims the benefit of priority from Japanese Patent Application No. 2013-148548, filed Jul. 17, 2013, the entire contents of which are incorporated herein by reference.

FIELD

Embodiments described herein relate to a recognition dictionary file evaluation apparatus used in a system for recognizing a commodity from an image obtained by photographing the commodity and a recognition dictionary evaluation method for evaluating a recognition dictionary file by the evaluation apparatus.

BACKGROUND

There is a technology in which an object is recognized from an image of the object captured by an image capturing section. In such a technology, an appearance feature amount of the object is extracted from the image and then compared with feature amount data of each reference image registered in a recognition dictionary file to calculate a similarity degree of the feature amounts. Then, an object equivalent to the reference image having the highest similarity degree is recognized as the object photographed by the image capturing section.

In recent years, it has been proposed to apply such an object recognition technology to a checkout system (POS system) of a retail store to recognize commodities purchased by a customer. In this case, feature amount data indicating the appearance feature amount of a commodity associated with items of each commodity, respectively, and specified with the item is registered in the recognition dictionary file. In other words, the commodity of which the feature amount data is not registered in the recognition dictionary file cannot be recognized.

For example, in a retail store which deals in fresh food, the sales of an unregistered commodity of which the feature amount data is not registered in the recognition dictionary file may be started due to the commodity replacement and the like. In this case, the store adds the feature amount data of the unregistered commodity to the recognition dictionary file before the sales starts. However, the addition of the feature amount data of the unregistered commodity may leads to a reduction in the recognition rate of the commodity which has already been registered. There also exists a case where the recognition rate of the commodity of which the feature amount data is added is lower than the expected recognition rate. Such a problem may also be caused by the change of the feature amount data as well as by the addition of the feature amount data.

BRIEF DESCRIPTION OF THE DRAWINGS

FIG. 9 is a diagram illustrating one example of the recognition rate table before the recognition dictionary file is updated; and FIG. 10 is a diagram illustrating one example of the recognition rate table after the recognition dictionary file is updated.

DETAILED DESCRIPTION

In accordance with one embodiment, a recognition dictionary evaluation apparatus comprises a calculation module, an evaluation module, a detection module and a notification module. The calculation module calculates, in response to the update of a recognition dictionary file in which feature amount data indicating appearance feature amount of each commodity is stored, a recognition rate by item of each commodity according to the feature amount data of the updated recognition dictionary file. The evaluation module evaluates the recognition dictionary file based on the recognition rate by item of each commodity calculated by the calculation module. The detection module detects, in a case in which the recognition dictionary file is evaluated to be improper by the evaluation module, a low recognition commodity of which a correct recognition rate that a commodity is correctly recognized from all commodities is lower than a given level, and an incorrect recognition commodity of which an incorrect recognition rate is high within the recognition rate by item of the low recognition commodity. The notification module notifies the items of the low recognition commodity and the incorrect recognition commodity detected by the detection module.

An embodiment of the recognition dictionary evaluation apparatus is described below with reference to the accompanying drawings.

In the present embodiment, the functions of an update apparatus and an evaluation apparatus of a recognition dictionary file are included in a scanner apparatus 1 functioning as a commodity recognition apparatus of a store checkout system.

Figure 1:
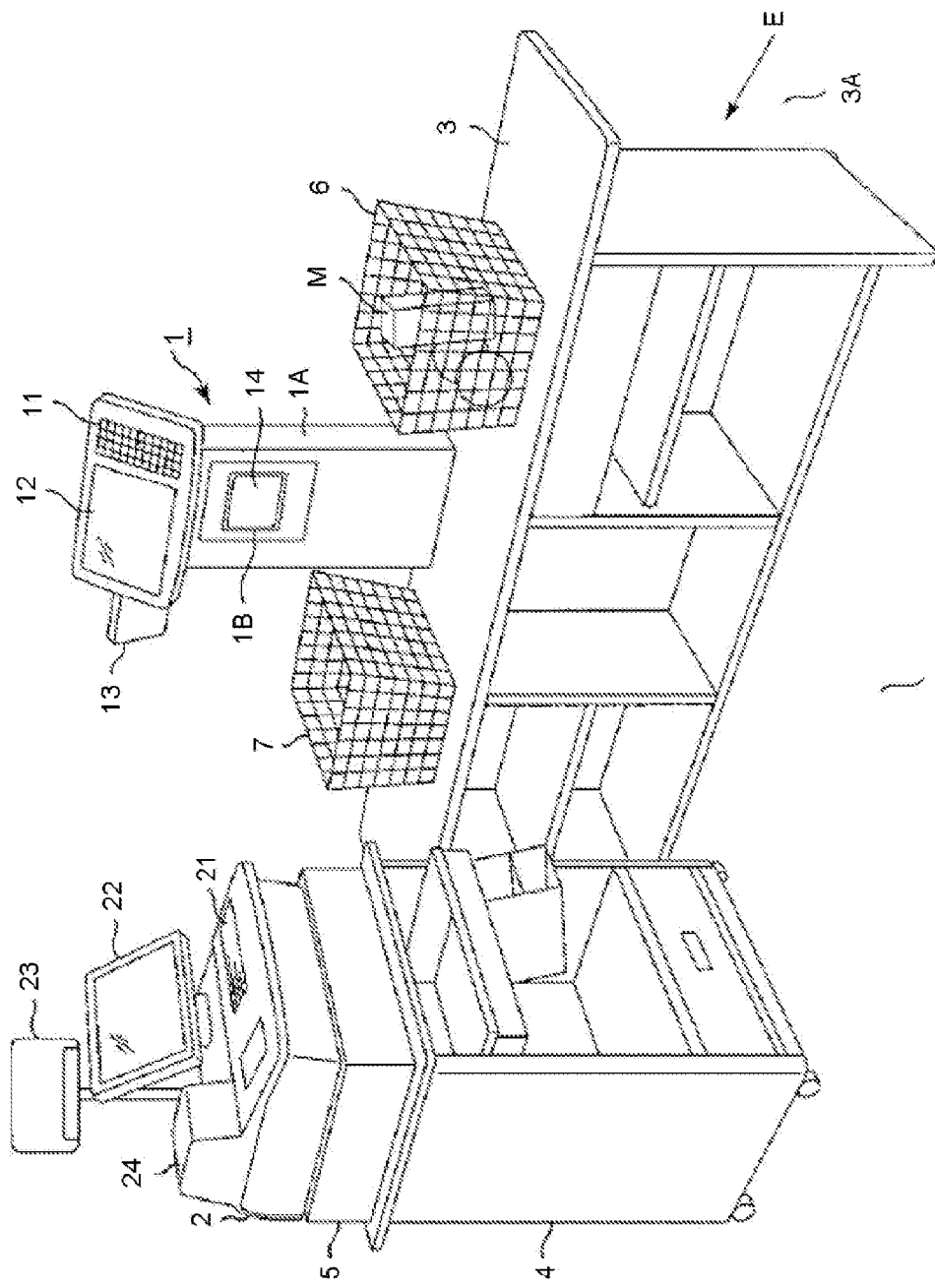
FIG. 1 is an external view of a store checkout system according to one embodiment.

FIG. 1 is an external view of a store checkout system using the scanner apparatus 1. The system includes the scanner apparatus 1 acting as a registration section for registering a commodity purchased by a customer and a POS (Point Of Sales) terminal 2 acting as a settlement section for processing the payment by the customer. The scanner apparatus 1 is mounted on a checkout counter 3. The POS terminal 2 is arranged on a register table 4 through a drawer 5. The scanner apparatus 1 and the POS terminal 2 are electrically connected with each other through a communication cable 8 (refer to FIG. 2).

The scanner apparatus 1 comprises a keyboard 11, a touch panel 12 and a display for customer 13. Those display or operation devices (keyboard 11, touch panel 12 and display for customer 13) are attached to a thin rectangular-shaped housing 1A constituting a main body of the scanner apparatus 1.

An image capturing section 14 is installed in the housing 1A. A reading window 1B is formed in a rectangular shape at the front side of the housing 1A. The image capturing section 14 comprises a CCD (Charge Coupled Device) image capturing element acting as an area image sensor, a drive circuit thereof, and an image capturing lens for focusing the image of an image capturing area on the CCD image capturing element. The image capturing area refers to the area of a frame image which is focused on the CCD image capturing element through the image capturing lens from the reading window 1B. The image capturing section 14 outputs the image focused on the image capturing area of the CCD image capturing element through the image capturing lens. The area image sensor, which is not limited to the CCD image capturing element, may be, for example, a CMOS (complementary metal oxide semiconductor) device.

The POS terminal 2 comprises a keyboard 21, a display for operator 22, a display for customer 23 and a receipt printer 24 as devices required for settlement.

The checkout counter 3 is arranged along a customer passage 3A. The register table 4 is arranged at a side opposite to the customer passage 3A with respect to the checkout counter 3 at a substantially right angle to the checkout counter 3. Specifically, the register table 4 is located at the end of the checkout counter 3 at the downstream side of the passage 3A in a movement direction of a customer indicated by an arrow E. Therefore, the checkout counter 3 and the register table 4 are arranged in an L-shape to define a space 3B for a shop clerk in charge of settlement, i.e., so called casher.

At the approximate center of the checkout counter 3, the housing 1A of the scanner apparatus 1 is vertically arranged such that the keyboard 11, the touch panel 12 and the reading window 1B are directed to the space for a shop clerk (cashier). The display for customer 13 of the scanner apparatus 1 is arranged on the housing 1A, facing to the customer passage 3A.

A first upper surface portion of the checkout counter 3 at the upstream side thereof through the scanner apparatus 1 in the customer movement direction serves as a space for placing a shopping basket 6 in which an unregistered commodity M purchased by a customer is held. On the other side, a second upper surface portion at the downstream side through the scanner apparatus 1 serves as an another space for placing a shopping basket 7 in which a commodity M registered by the scanner apparatus 1 is held.

Figure 2:
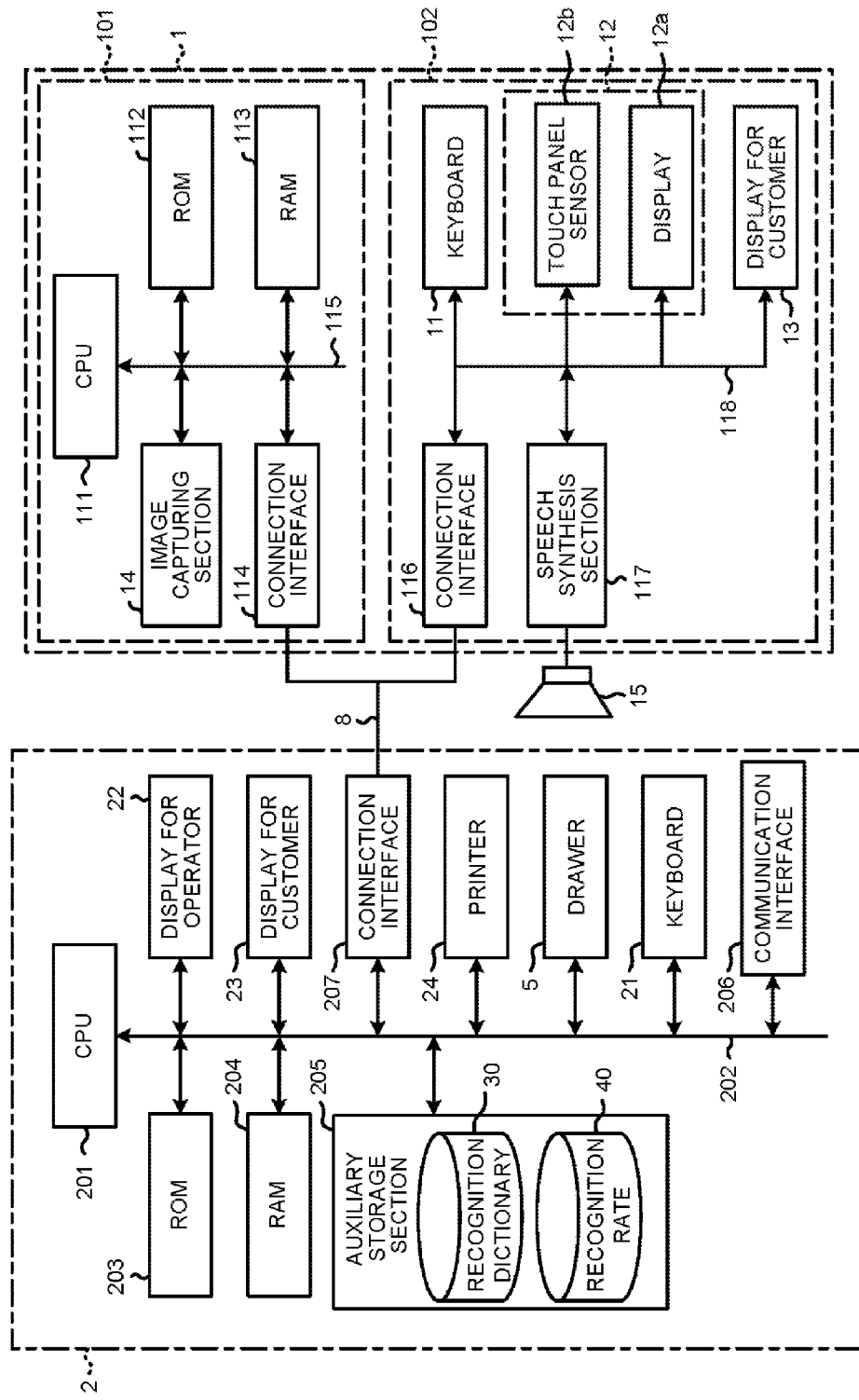
FIG. 2 is a block diagram illustrating the hardware constitutions of a scanner apparatus and a POS terminal of the store checkout system shown in FIG. 1.

FIG. 2 is a block diagram illustrating the hardware constitutions of the scanner apparatus 1 and the POS terminal 2. The scanner apparatus 1 comprises a scanner section 101 and an operation-output section 102. The scanner section 101 includes a CPU (Central Processing Unit) 111, a ROM (Read Only Memory) 112, a RAM (Random Access Memory) 113, a connection interface 114 and the image capturing section 14. The CPU 111, the ROM 112, the RAM 113 and the connection interface 114 are connected with each other via a bus line 115. The image capturing section 14 is connected with the bus line 115 via an input/output circuit (not shown).

The CPU 111 is a central part of a computer. The CPU 111 controls each section to achieve various functions of the scanner apparatus 1 according to an operating system or an application program.

The ROM 112 is a main storage part of the computer. The ROM 112 stores the operating system and the application program mentioned above. As occasion demands, the ROM 112 also stores data required to execute various processing by the CPU 111. The application program includes a commodity recognition program, a recognition dictionary update program and a recognition dictionary evaluation program which will be described later.

The RAM 113 is also a main storage part of the computer mentioned above. The RAM 113 stores data required to execute various processing by the CPU 111 as needed. Further, the RAM 113 is also used as a work area for the CPU 111 when various processing is executed.

The operation-output section 102 includes the keyboard 11, the touch panel 12, the display for customer 13, a connection interface 116 and a speech synthesis section 117. The keyboard 11, the touch panel 12 and the display for customer 13 are connected with a bus line 118 via an input/output circuit (not shown), respectively. The connection interface 116 and the speech synthesis section 117 are also connected with the bus line 118.

The touch panel 12 comprises a panel type display 12a and a touch panel sensor 12b overlaid on the screen of the display 12a.

The speech synthesis section 117 outputs a speech or voice signal to a speaker 15 in response to a command input via the bus line 118. The speaker 15 converts the voice signal into a voice to output it.

The POS terminal 2 carries a CPU 201 serving as a main body of a control section. The CPU 201 is connected with a ROM 203, a RAM 204, an auxiliary storage section 205, a communication interface 206 and a connection interface 207 through a bus line 202. The keyboard 21, the display for operator 22, the display for customer 23, the printer 24 and the drawer 5 are all connected with the bus line 202 via an input-output circuit (not shown), respectively.

The communication interface 206 is connected with a store server (not shown) via a network such as a LAN (Local Area Network) and the like. Through this connection, the POS terminal 2 can perform a transmission/reception of data with the store server.

The connection interface 207 is connected with the two connection interfaces 114 and 116 of the scanner apparatus 1 via a communication cable 8. Through the connection, the POS terminal 2 receives information from the scanner section 101 of the scanner apparatus 1. The POS terminal 2 transmits and receives a data signal to and from the keyboard 11, the touch panel 12, the display for customer 13 and the speech synthesis section 117 which constitute the operation-output section 102 of the scanner apparatus 1. On the other hand, the scanner apparatus 1 can access the data file stored in the auxiliary storage section 205 of the POS terminal 2 through this connection.

The auxiliary storage section 205, which is, for example, a HDD (Hard Disk Drive) device or a SSD (Solid State Drive) device, further stores data files such as a recognition dictionary file 30, a recognition rate file 40 and the like, in addition to various programs.

Figure 3:
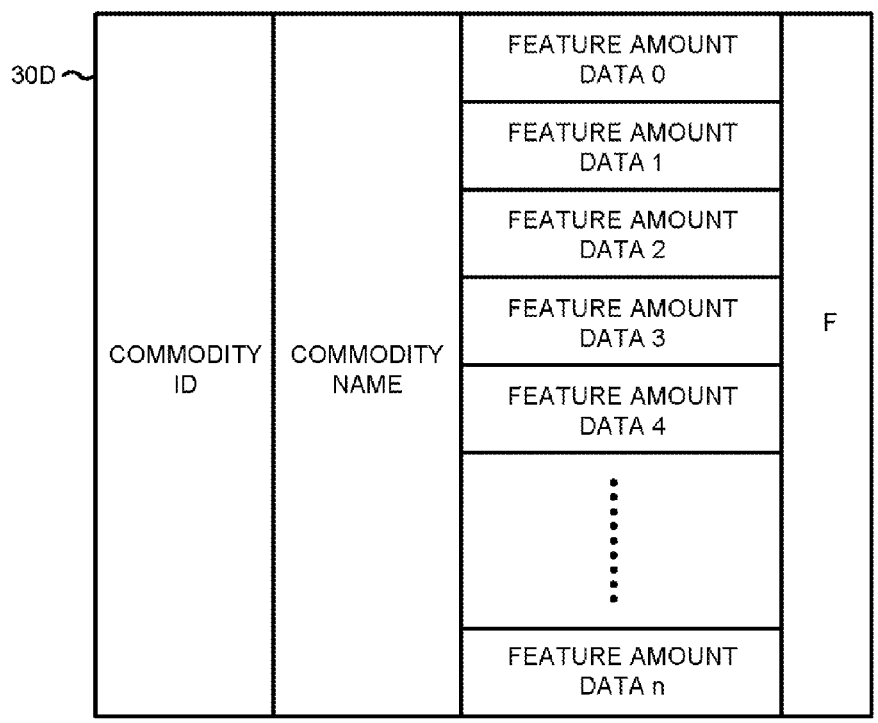
FIG. 3 is a diagram schematically illustrating the structure of recognition dictionary data stored in the recognition dictionary file.

Recognition dictionary data 30D for each commodity is stored in the recognition dictionary file 30. FIG. 3 is a schematic view illustrating the structure of the recognition dictionary data 30D. As shown in FIG. 3, the recognition dictionary data 30D includes each item of commodity ID, commodity name, feature amount data and state flag F. The commodity ID is a unique code attached to each commodity for identifying a commodity serving as a recognition target. The commodity name is an item of the commodity specified with a corresponding commodity ID.

The feature amount data is data obtained by extracting, from a reference image obtained by photographing a commodity specified with a corresponding commodity ID, appearance feature amount serving as surface information (appearance shape, color, pattern, concave-convex state and the like) of the commodity and representing the extracted appearance feature amount in the form of parameters. A plurality of feature amount data is stored in the recognition dictionary data 30D for one commodity. Each feature amount data is generated according to a reference image obtained by photographing one commodity from different directions. The number of the feature amount data is not fixed and it may be different according to different commodities.

The state flag F is information for identifying whether the recognition dictionary data 30D is valid or invalid. In the present embodiment, the state flag F is "0" if the recognition dictionary data 30D is valid and "1" if the recognition dictionary data 30D is invalid.

Figure 4:
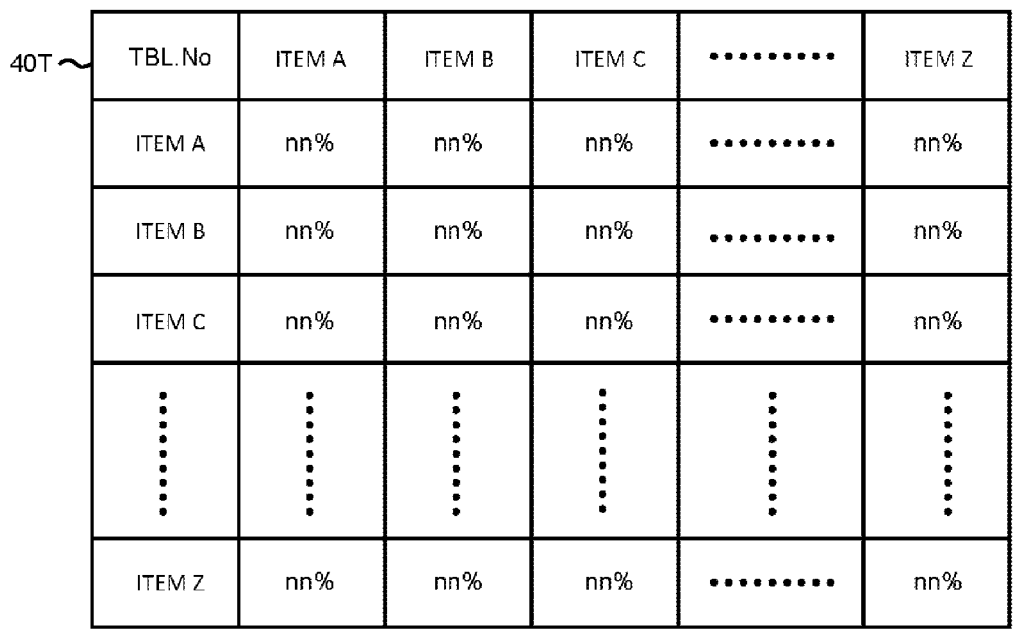
FIG. 4 is a diagram schematically illustrating the structure of a recognition rate table stored in the recognition rate file.

A plurality of recognition rate tables 40T is stored in the recognition rate file 40. FIG. 4 is a schematic view illustrating the structure of the recognition rate table 40T. As shown in FIG. 4, the recognition rate table 40T has a matrix structure in which the number of cells in the row direction is equal to the number of cells in the column direction. A unique table number is set in the first cell (which is both the first cell in the first row and the first cell in the first column). The table number is a positive integer increasing one at a time from, for example, "1".

The items (commodity name) of each commodity of which the recognition dictionary data 30D is registered in the recognition dictionary file 30 are respectively set in each cell of the first row except the first cell and each cell of the first column except the first cell in the same order.

In each cell in the second and subsequent rows and the second and subsequent columns, a recognition rate (nn %) by item, which is obtained when the commodity specified with the item set in the first cell of the column thereof is recognized with the feature amount data of each commodity registered in the recognition dictionary file 30, is set in the order of the items set in the first cell of each row.

Figure 5:
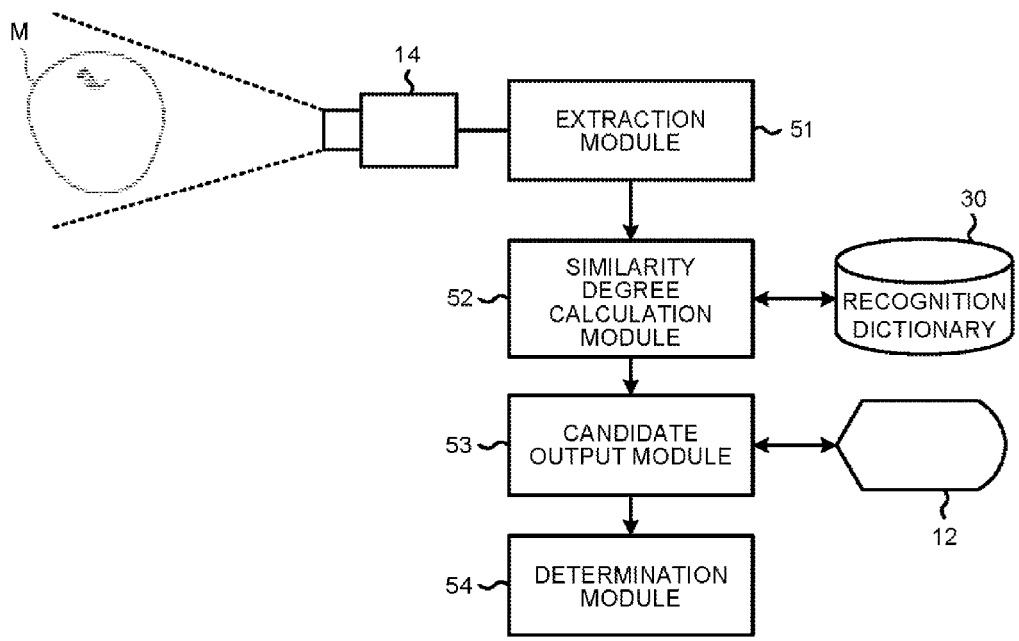
FIG. 5 is a block diagram illustrating the functional components of the scanner apparatus when operating as the commodity recognition apparatus.

FIG. 5 is a block diagram illustrating the functional components of the scanner apparatus 1 when operating as the commodity recognition apparatus. In a case of recognizing a commodity M purchased by a customer, using the scanner apparatus 1, the user operates the keyboard 11 or the touch panel 12 to select the commodity recognition mode. Then an operator holds the commodity M to the reading window 1B.

When the commodity recognition mode is selected, the commodity recognition program is started in the scanner apparatus 1. Then the CPU 111 realizes, according to the commodity recognition program, the functions as an extraction module 51, a similarity degree calculation module 52, a candidate output module 53 and a determination module 54. Hereinafter, each of these functions is described in detail.

When the commodity M is held to the reading window 1B, the CPU 111 functions as the extraction module 51. The CPU 111 extracts, from an image captured by the image capturing section 14, the appearance feature amount such as the shape, surface hue, pattern, concave-convex state and the like of the commodity M imaged in the captured image.

When the appearance feature amount is extracted, the CPU 111 functions as the similarity degree calculation module 52. The CPU 111 compares the appearance feature amount extracted by the extraction module 51 with each of the feature amount data for each commodity registered in the recognition dictionary file 30 in sequence to calculate a similarity degree indicating, with hamming distance for example, how much similar the appearance feature amount is to the feature amount data for each item. At this time, the extracted appearance feature amount is not compared with the feature amount data of the recognition dictionary data 30D of which the state flag F is in an invalid state.

When the similarity degree is calculated for each item, the CPU 111 functions as the candidate output module 53. The CPU 111 selects, for example, the top five items in the descending order of the similarity degree. The CPU 111 outputs the commodities corresponding to the selected items as the recognition commodity candidates to display them on the touch panel 12 in a selectable manner.

When the recognition commodity candidates are displayed, the CPU 111 functions as the determination module 54. The CPU 111 determines the commodity selected from the recognition commodity candidates through an input-operation (selection) on the keyboard 11 or the touch panel 12 as the commodity purchased by the customer. Alternatively, the CPU 111 determines the commodity having the highest similarity degree within the recognition commodity candidates as the commodity purchased by the customer.

The sales data of the determined commodity is sent to the POS terminal 2 via the communication cable 8. In this way, the sales data of the commodity determined by the determination module 54 is registered in the POS terminal 2.

Figure 6:
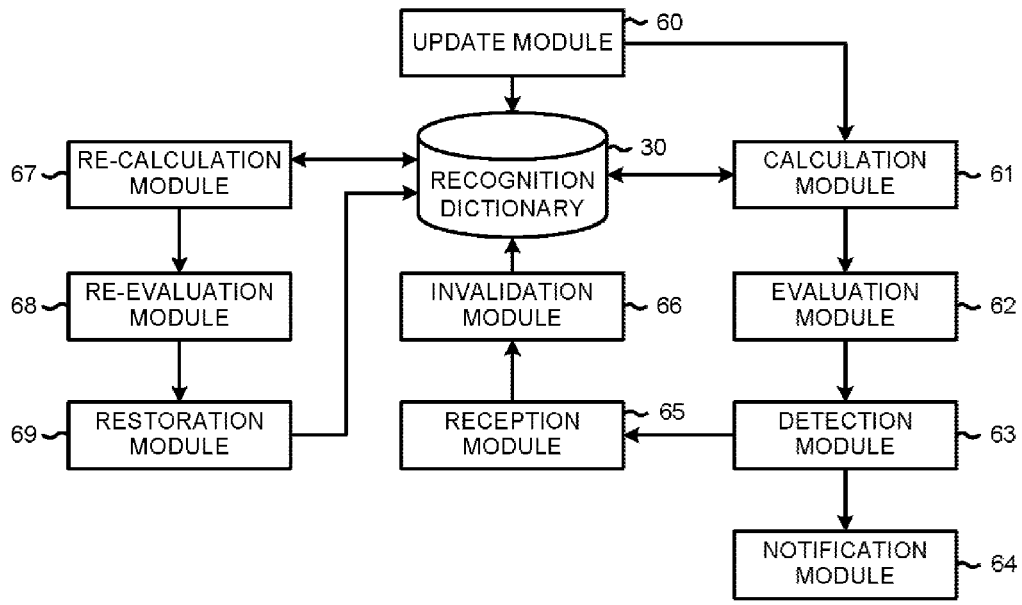
FIG. 6 is a block diagram illustrating the functional components of the scanner apparatus when operating as an update apparatus and an evaluation apparatus of the recognition dictionary file.

FIG. 6 is a block diagram illustrating the functional components of the scanner apparatus 1 when operating as the update apparatus and the evaluation apparatus of the recognition dictionary file 30. In a case of adding a new recognition dictionary data 30D to the recognition dictionary file 30, or in a case of changing the feature amount data of the recognition dictionary data 30D which is already registered in the recognition dictionary file 30, the user operates the keyboard 11 or the touch panel 12 to select the recognition dictionary update mode.

When the recognition dictionary update mode is selected, the recognition dictionary update program is started in the scanner apparatus 1. Then the CPU 111 realizes the function of an update module 60 according to the recognition dictionary update program. The recognition dictionary evaluation program is also started in the scanner apparatus 1. The CPU 111 realizes, according to the recognition dictionary evaluation program, the functions of a calculation module 61, an evaluation module 62, a detection module 63, a notification module 64, a reception module 65, an invalidation module 66, a re-calculation module 67, a re-evaluation module 68 and a restoration module 69. Hereinafter, each function is described in detail with reference to the flowchart shown in FIG. 7 and FIG. 8. The content of the processing described below is just an example, and the same result can be achieved by carrying out various processing properly.

Figure 7:
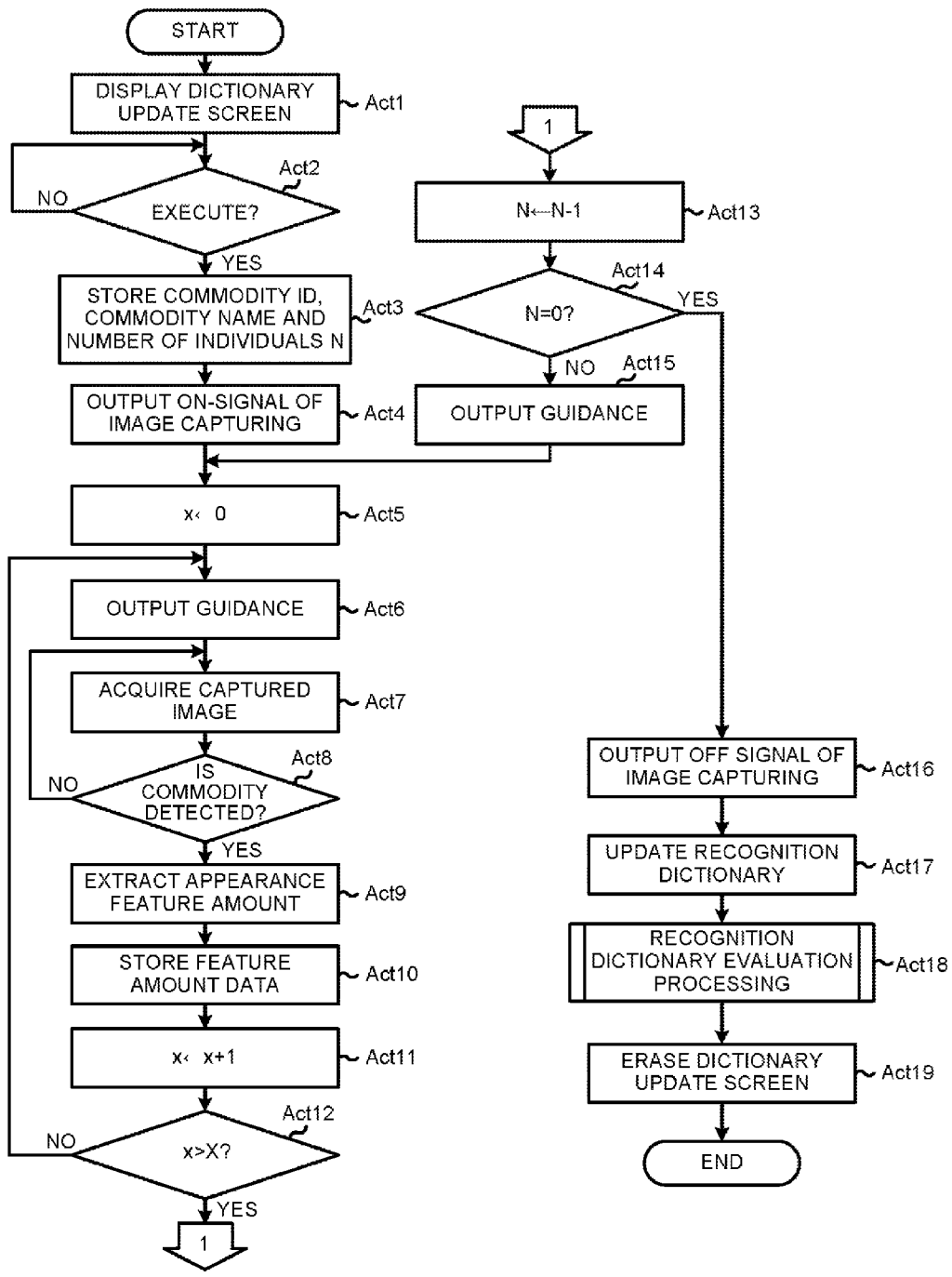
FIG. 7 is a flowchart illustrating the main procedure of a recognition dictionary update processing executed by a CPU of the scanner apparatus according to a recognition dictionary update program.

When the recognition dictionary update program is started, the CPU 111 starts the recognition dictionary update processing of a procedure shown in the flowchart in FIG. 7. First, the CPU 111 displays a dictionary update screen on the display 12a of the touch panel 12 (ACT 1). An input column for inputting the commodity ID and the number of individuals N and a display column for displaying the commodity name are formed on the dictionary update screen.

In a case of adding or changing the recognition dictionary data 30D, the user prepares a plurality of commodities (hereinafter referred to as standard commodity) having a standard appearance within the commodities serving as the targets of the data 30D. The user operates the keyboard 11 or the touch panel 12 to input the commodity ID of the target commodity. The user further inputs the number of the prepared standard commodities as the number of individuals N.

If the commodity ID is input, the CPU 111 reads the commodity name of the commodity specified with the commodity ID from a commodity database (not shown) and displays it in the display column. If the commodity ID and the number of individuals N are input, the CPU 111 displays an execution button on the dictionary update screen. Then the CPU 111 waits until the execution button is input (ACT 2).

The user having input the commodity ID and the number of individuals N on the dictionary update screen touches the execution button. If the touch panel sensor 12b detects that the area of the execution button is touched, the CPU 111 determines that the execution button is input (YES in ACT 2). The CPU 111 stores the commodity ID, the commodity name and the number of individuals N displayed on the dictionary update screen in an update target data storage work area (hereinafter referred to as update target area) formed in the RAM 113 (ACT 3). The CPU 111 outputs an ON-signal of image capturing to the image capturing section 14 (ACT 4). The image capturing section 14 starts an image capturing operation to photograph the image capturing area according to the ON-signal of image capturing. The frame images of the image capturing area captured by the image capturing section 14 are sequentially stored in the image data storage work area (hereinafter referred to as image area) formed in the RAM 113.

The CPU 111 resets a counter x to "0" (ACT 5). The CPU 111 outputs dictionary update guidance preset in association with the value of the counter x (ACT 6). For example, when the value of the counter x is "0", the guidance of "Hold the front side of the standard commodity to the reading window please" is output. The output method of the guidance may be display output to the display 12a, a speech output from the speaker 15, or both of the display output and the speech output.

The CPU 111 acquires the frame image stored in the image area (ACT 7). The CPU 111 confirms whether or not the standard commodity is imaged in the frame image (ACT 8). The CPU 111 extracts a contour line and the like from the binary image of the frame image. Then the CPU 111 tries to extract the contour of the object imaged in the frame image. If the entire contour of the object is extracted, the CPU 111 regards that the standard commodity is imaged in the frame image. If the standard commodity is not imaged in the frame image (NO in ACT 8), the CPU 111 acquires a next frame image from the image area (ACT 7). Then the CPU 111 confirms whether or not the standard commodity is imaged in the frame image (ACT 8).

If the standard commodity is imaged in the frame image (YES in ACT 8), the CPU 111 cuts out the image of the standard commodity from the frame image. The CPU 111 extracts the appearance feature amount such as the shape, surface color, pattern, concave-convex state and the like of the standard commodity from the image of the standard commodity (ACT 9).

The CPU 111 converts the extracted appearance feature amount into a given parameter. The CPU 111 stores the parameter of the appearance feature amount in the update target area as the feature amount data obtained when the standard commodity is photographed from the front side (ACT 10).

The CPU 111 increases the counter x by "1" (ACT 11). The CPU 111 determines whether or not the value of the counter x is greater than a given upper limit value X (ACT 12). The upper limit value X is determined according to the number of the feature amount data obtained from one standard commodity, and in the present embodiment, since the number of the feature amount data obtained from one standard commodity is "6", the upper limit value X is "5".

If the counter x is not greater than the upper limit value X (NO in ACT 12), the CPU 111 returns to execute the processing in ACT 6. The CPU 111 outputs the guidance preset in association with the value of the counter x. For example, when the value of the counter x is "1", the guidance of "Hold the back side of the standard commodity to the reading window please" is output. Sequentially, the CPU 111 executes the processing in ACT 7-ACT 12 again. In this way, the feature amount data obtained when the standard commodity is photographed from the back side is also stored in the update target area. Then the value of the counter x becomes "2". In this case, the value of the counter x is not greater than the upper limit value X. Thus, the processing in ACT 6-ACT 12 is repeated.

The value of the counter x is increased to "2", "3", "4" and then "5". Meanwhile, the guidance obtained by replacing the "back side" in the guidance output when the value of the counter x is "1" with the "right side face", "left side face", "upside" and "downside", respectively, is output in sequence. Thus, the feature amount data obtained when the standard commodity is photographed from the right side face, the feature amount data obtained when the standard commodity is photographed from the left side face, the feature amount data obtained when the standard commodity is photographed from the upside and the feature amount data obtained when the standard commodity is photographed from the downside are further stored in the update target area.

If the value of the counter x is greater than the upper limit value X (YES in ACT 12), the CPU 111 decreases the number of individuals N by "1" (ACT 13). The CPU 111 determines whether or not the number of individuals N is "0" (ACT 14). If the number of individuals N is greater than "0" (NO in ACT 14), the CPU 111 outputs guidance of, for example, "Please exchange the standard commodity" instructing to exchange the standard commodity (ACT 15). After that, the CPU 111 returns to execute the processing in ACT 5. The CPU 111 resets the value of the counter x to "0". The CPU 111 executes the processing following ACT 6 again. As a result, the feature amount data obtained when the second standard commodity is respectively photographed from six directions, that is, the "front side", "back side", "right side face", "left side face", "upside" and "downside" are stored in the update target area.

The CPU 111 repeats the processing in ACT 5-ACT 15 until the number of individuals N becomes "0". Thus, the feature amount data obtained when each of the N commodities prepared as the standard commodities is photographed from six directions, that is, the (6*N) feature amount data are stored in the update target area.

The upper limit value X of the counter x is not limited to "5", and it may be set to a proper value X with the storage capacity of the recognition dictionary file 30 and the ability as the commodity recognition apparatus and the like taken into consideration. The content of the guidance is described as one example, and it goes without saying that the content of the guidance is not limited to that exemplified in the present embodiment.

When the number of individuals N becomes "0" (YES in ACT 14), the CPU 111 outputs an OFF signal of image capturing to the image capturing section 14 (ACT 16). The image capturing section 14 ends the image capturing operation according to the OFF signal of image capturing.

The CPU 111 updates the recognition dictionary file 30 based on the commodity ID, the commodity name and each feature amount data stored in the update target area (ACT 17: update module 60). Specifically, the CPU 111 determines whether or not the commodity ID is registered in the recognition dictionary file 30. If the commodity ID is not yet registered in the recognition dictionary file 30, the CPU 111 generates a recognition dictionary data 30D according to the commodity ID, the commodity name and each feature amount data, and adds the generated recognition dictionary data 30D to the recognition dictionary file 30. At this time, the state flag F of the recognition dictionary data 30D is "0" which indicates that the recognition dictionary data 30D is valid.

On the contrary, if the commodity ID is registered in the recognition dictionary file 30, the CPU 111 copies the recognition dictionary data 30D containing the commodity ID to a data saving work area (hereinafter referred to as saving area) formed in the RAM 113. Then the CPU 111 replaces the feature amount data of the recognition dictionary data 30D containing the commodity ID of the recognition dictionary file 30 with the feature amount data in the update target area. In a case where the state flag F of the recognition dictionary data 30D is "1" which indicates that the recognition dictionary data 30D is invalid, the value "1" is changed to the value "0" which indicates that the recognition dictionary data 30D is valid. In a case where the state flag F of the recognition dictionary data 30D is "0" which indicates that the recognition dictionary data 30D is valid, the value is not changed.

In this way, after the recognition dictionary file 30 is updated, the recognition dictionary evaluation program is started in the scanner apparatus 1. Thus, the CPU 111 starts a recognition dictionary evaluation processing of a procedure shown in the flowchart in FIG. 8 (ACT 18).

First, the CPU 111 calculates a recognition rate by item for each commodity using the feature amount data of each commodity registered in the updated recognition dictionary file 30 (ACT 21: calculation module 61). Specifically, the CPU 111 sequentially reads the recognition dictionary data 30D of which the state flag F is "0" indicating "valid" from the recognition dictionary file 30. The recognition dictionary data 30D of which the state flag F is "1" indicating "invalid" is not read.

Every time the recognition dictionary data 30D is read, the CPU 111 randomly selects a given number of (for example, ten) feature amount data from the plurality of feature amount data contained in the recognition dictionary data 30D. The CPU 111 repeats the following processing every time it selects the feature amount data.

The CPU 111 regards the selected feature amount data as the appearance feature amount obtained from the captured image of the commodity specified with the commodity ID of the recognition dictionary data 30D. The CPU 111 compares the appearance feature amount with the feature amount data of each commodity registered in the recognition dictionary file 30 in sequence to calculate a similarity degree indicating, with hamming distance for example, how much similar the appearance feature amount is to the feature amount data for each item. At this time, the appearance feature amount is not compared with the feature amount data of the recognition dictionary data 30D of which the state flag F indicates an invalid state.

After the similarity degree by item is calculated individually for each of the selected feature amount data, the CPU 111 calculates the average of the similarity degree for each item. Then the CPU 111 converts the average value of the similarity degree by item into a percentage to calculate the recognition rate by item of the commodity specified with the commodity ID of the recognition dictionary data 30D.

After the processing in ACT 21 is ended, the CPU 111 creates a recognition rate table 40T with the recognition rate by item of each commodity calculated in the processing in ACT 21 (ACT 22). Specifically, the CPU 111 sequentially sets the item of each recognition dictionary data 30D read from the recognition dictionary file 30 in the processing in ACT 21 in each cell of the first row except the first cell and each cell of the first column except the first cell in the recognition rate table 40T. Next, the CPU 111 sets the recognition rate by item for the commodity of the item set in the first cell of the column thereof in each cell in the second and subsequent rows and the second and subsequent columns of the recognition rate table 40T in the order of the item set in the first cell of each row. The CPU 111 compares the table numbers respectively set in each recognition rate table 40T stored in the recognition rate file 40 to acquire the maximum value. The CPU 111 sets a table number obtained by increasing the maximum value by "1" in the first cell (which is both the first cell in the first row and the first cell in the first column) of the recognition rate table 40T created currently. For example, the table number of a recognition rate table 40T-1 shown in FIG. 9 serving as one example of the recognition rate table before update is "0011" (maximum value), in this case, a table number obtained by increasing the maximum value by "1" is set in the first cell (which is both the first cell in the first row and the first cell in the first column) of the recognition rate table 40T after update, as a result, the table number of a recognition rate table 40T-2 shown in FIG. 10 becomes "0012". FIG. 9 and FIG. 10 are described in detail later.

After the recognition rate table 40T is created, the CPU 111 evaluates the recognition dictionary file 30 based on the recognition rate table 40T (ACT 23: evaluation module 62). For example, the CPU 111 determines whether or not a preset condition within evaluation conditions a1, a2, a3 and a4 (described later) is met, and the recognition rate file 40 is determined to be proper if the preset condition is met, and the recognition rate file 40 is determined to be improper if the preset condition is not met.

evaluation condition a1: "whether or not the correct recognition rate of the commodity of which the recognition dictionary data is updated is greater than a first threshold value"

evaluation condition a2: "whether or not the average of the correct recognition rates of all the commodities is greater than a second threshold value"

evaluation condition a3: "whether or not the lowering width of the average of the correct recognition rates of all the commodities is lower than a third threshold value"

evaluation condition a4: "whether or not the lowering width of the correct recognition rate of the commodity of which the recognition dictionary data is not updated is lower than a fourth threshold value"

Herein, the commodity of which the recognition dictionary data is updated is the commodity specified with the commodity ID stored in the update target area. The commodity of which the recognition dictionary data is not updated is the commodity specified with the commodity ID excluding the commodity ID stored in the update target area within the commodity IDs of all the recognition dictionary data 30D registered in the recognition dictionary file 30.

The correct recognition rate is a rate at which the commodity is recognized correctly. For example, the recognition rate set in the cell where the row in which the "item A" is set in the first column of the recognition rate table 40T intersects with the column in which the "item A" is set in the first row of the same recognition rate table 40T is the correct recognition rate of the commodity of "item A". Similarly, the recognition rate set in the cell where the row in which the "item B" is set in the first column of the recognition rate table 40T intersects with the column in which the "item B" is set in the first row of the same recognition rate table 40T is the correct recognition rate of the commodity of "item B".

The lowering width of the correct recognition rate is a value indicating how much the correct recognition rate of each commodity calculated according to the recognition rate table 40T generated currently decreases with respect to the correct recognition rate of the same commodity calculated according to the recognition rate table 40T generated previously. For example, in a case where the previous correct recognition rate is 95% while the current correct recognition rate is 93%, the lowering width is 2%.

Thus, in a case of the evaluation condition a1, it is evaluated to be proper if the correct recognition rate is greater than the first threshold value, and it is evaluated to be improper if the correct recognition rate is lower than the first threshold value. In a case of the evaluation condition a2, it is evaluated to be proper if the average of the correct recognition rates is greater than the second threshold value, and it is evaluated to be improper if the average of the correct recognition rates is lower than the second threshold value. In a case of the evaluation condition a3, it is evaluated to be proper if the lowering width of the average of the correct recognition rates is lower than the third threshold value, and it is evaluated to be improper if the lowering width of the average of the correct recognition rates is not lower than the third threshold value. In a case of the evaluation condition a4, it is evaluated to be proper if the lowering width of the correct recognition rate is lower than the fourth threshold value, and it is evaluated to be improper if the lowering width of the correct recognition rate is not lower than the fourth threshold value.

No limitation is given to the first-fourth threshold values. For example, in a case of maintaining a high commodity recognition precision of the scanner apparatus 1, the first and the second threshold values are set to values (larger than 90%) which are sufficiently large, and the third and the fourth threshold values are set to values (lower than 5%) which are sufficiently small. In this way, the risk due to the update of the recognition dictionary file 30 can be reduced.

The CPU 111 confirms the evaluation result of the recognition rate file 40 (ACT 24). If it is confirmed that the recognition rate file 40 is proper (YES in ACT 24), the CPU 111 executes the processing in ACT 36. In ACT 36, the CPU 111 stores the recognition rate table 40T created in the processing in ACT 22 in the recognition rate file 40.

On the contrary, if it is confirmed that the recognition rate file 40 is improper (NO in ACT 24), the CPU 111 detects a low recognition commodity of which the correct recognition rate is lower than a given level from the commodities by reference to the recognition rate table 40T created in the processing in ACT 22 (ACT 25: detection module 63). The CPU 111 detects an incorrect recognition commodity of which the incorrect recognition rate is high within the recognition rate by item of the low recognition commodity (ACT 26: detection module 63). The CPU 111 displays and notifies the items of the low recognition commodity and the incorrect recognition commodity on the touch panel 12 (ACT 27: notification module 64).

The given level can be any value. For example, it is considered to set the first threshold value as the given level. It is also assumed that a plurality of low recognition commodity is detected according to the setting of the given level. In this case, the incorrect recognition commodity may be detected for each of the determination recognition commodities, alternatively, only one item is selected from the low recognition commodities of which the correct recognition rate is the lowest, and the incorrect recognition commodity may be detected for the low recognition commodity.

The CPU 111 outputs guidance urging the user to select whether to invalidate the low recognition commodity or the incorrect recognition commodity. The CPU 111 waits until the item (hereinafter referred to as invalidation item) of the commodity to be invalidated is selected (ACT 28: reception module 65).

If the invalidation of the low recognition commodity is selected through an input operation on the keyboard 11 or the touch panel 12, the CPU 111 retrieves the recognition dictionary file 30 and rewrites the state flag F of the recognition dictionary data 30D, in which the item of the low recognition commodity is set, to "1" (ACT 29). On the contrary, if the invalidation of the incorrect recognition commodity is selected, the CPU 111 similarly retrieves the recognition dictionary file 30 and rewrites the state flag F of the recognition dictionary data 30D, in which the item of the incorrect recognition commodity is set, to "1" (ACT 30).

After that, the CPU 111 calculates the recognition rate by item of each commodity again using the feature amount data of each commodity registered in the recognition dictionary file 30. The CPU 111 calculates the recognition rate by item of each commodity with the data of the recognition dictionary file 30 excluding the recognition dictionary data 30D invalidated in the processing in ACT 29 or ACT 30 (ACT 31: re-calculation module 69). The CPU 111 creates a recognition rate table 40T with the recognition rate by item of each commodity (ACT 32). At this time, similar as the processing in ACT 22, a number obtained by increasing the maximum value of the table number of each recognition rate table 40T stored in the recognition rate file 40 by "1" is set in the recognition rate table 40T as the table number.

The CPU 111 evaluates the recognition dictionary file 30 based on the created recognition rate table 40T (ACT 33: re-evaluation module 68). The evaluation method in this case is the same as that described in the processing in ACT 23.

The CPU 111 confirms the evaluation result of the recognition rate file 40 (ACT 34). If it is confirmed that the recognition rate file 40 is proper (YES in ACT 34), the CPU 111 executes the processing in ACT 36. The CPU 111 stores the recognition rate table 40T created in the processing in ACT 32 in the recognition rate file 40.

On the contrary, if it is confirmed that the recognition rate file 40 is improper (NO in ACT 34), the CPU 111 restores the recognition dictionary file 30 updated in the processing in ACT 17 to the state before update (ACT 35: restoration module 69). Specifically, the CPU 111 returns the state flag, which is changed to "1" in the processing in ACT 29 or ACT 30, to "0". If a new recognition dictionary data 30D is added to the recognition dictionary file 30 in the processing in ACT 17, the CPU 111 deletes the added recognition dictionary data 30D from the recognition dictionary file 30. On the other hand, if the recognition dictionary data 30D is copied to the saving area in the processing in ACT 17, the CPU 111 retrieves the recognition dictionary file 30 to detect the recognition dictionary data 30D in which the commodity ID the same as the commodity ID of the recognition dictionary data 30D copied to the saving area is set. The CPU 111 replaces the detected recognition dictionary data 30D with the recognition dictionary data 30D copied to the saving area.

After the processing in ACT 35 or ACT 36 is executed, the recognition dictionary evaluation processing is ended.

Return to the description in FIG. 7. After the recognition dictionary evaluation processing is ended, the CPU 111 erases the dictionary update screen displayed on the display 12a (ACT 19). The CPU 111 clears the work area of the RAM 113. Then, the recognition dictionary update processing is ended.

One example of the recognition rate table 40T before the recognition dictionary file 30 is updated is shown in FIG. 9, and one example of the recognition rate table 40T after the recognition dictionary file 30 is updated is shown in FIG. 10. For the sake of the convenience of description, the recognition dictionary file 30 before update is endowed with a mark of "30-1" and the recognition dictionary file 30 after update is endowed with a mark of "30-2" to distinguish the recognition dictionary files 30 before and after update. Similarly, the recognition rate table 40T before update is endowed with a mark of "40T-1" and the recognition rate table 40T after update is endowed with a mark of "40T-2" to distinguish the recognition rate tables 40T before and after update. The recognition dictionary file 30 after the item of the incorrect recognition commodity is selected as the invalidation item is endowed with a mark of "30-3".

In this example, the recognition target commodities include three items of "apple", "mandarin orange" and "cucumber" in the state before update, while the commodity "lemon" is newly added as the recognition target after update. The correct recognition rate of the commodity "apple" decreases from 98% to 97%, the correct recognition rate of the commodity "mandarin orange" decreases from 97% to 95%, and the correct recognition rate of the commodity "cucumber" decreases from 96% to 95% due to the addition. The correct recognition rate of the commodity "lemon" is 93%, the probability that the commodity "lemon" is incorrectly recognized as the item "apple" is 2%, the probability that the commodity "lemon" is incorrectly recognized as the item "mandarin orange" is 4%, and the probability that the commodity "lemon" is incorrectly recognized as the item "cucumber" is 1%.

In this example, it is assumed that the first threshold value of the evaluation condition a1 is 95%, the second threshold value of the evaluation condition a2 is 96%, and both the third and the fourth threshold values of the evaluation conditions a3 and the a4 are 2%. In this case, when the evaluation condition a1 is applied, the correct recognition rate of the commodity "lemon" is 93%, thus, the recognition dictionary file 30-2 after update is determined to be improper. When the evaluation condition a2 is applied, the average of the correct recognition rates of all the commodities "apple", "mandarin orange", "cucumber" and "lemon" is 95%, thus, the recognition dictionary file 30-2 after update is also determined to be improper. When the evaluation condition a3 is applied, the lowering width of the average of the correct recognition rates of all the commodities is 2%, thus, the recognition dictionary file 30-2 after update is also determined to be improper. When the evaluation condition a4 is applied, in the commodities "apple", "mandarin orange" and "cucumber" of which the recognition dictionary data is not updated, the lowering width of the correct recognition rate of the commodity "mandarin orange" is 2%, thus, the recognition dictionary file 30-2 after update is also determined to be improper. The recognition dictionary file 30-2 after update is determined to be improper no matter which evaluation condition is adopted.

In a case where the recognition dictionary file 30-2 after update is determined to be improper, in the scanner apparatus 1, the commodity "lemon" is notified as the low recognition commodity, and the commodity "mandarin orange" of which the incorrect recognition rate is the highest within the recognition rate by item of the commodity "lemon" serving as the low recognition commodity is notified as the incorrect recognition commodity. Thus, the user considers whether to add the recognition dictionary data 30D of the commodity "lemon" or to retain the recognition dictionary data 30D of the commodity "mandarin orange". The user selects the incorrect recognition commodity "mandarin orange" as the invalidation item in the former case and selects the low recognition commodity "lemon" as the invalidation item in the latter case.

In a case in which the user selects the incorrect recognition commodity "mandarin orange" as the invalidation item, in the scanner apparatus 1, the recognition dictionary file 30-3 in which three items of commodities "apple", "cucumber" and "lemon" are registered is evaluated. As a result, in a case in which the recognition dictionary file 30-3 is evaluated to be proper, the recognition dictionary file 30-3 is applied to the processing in the subsequent commodity recognition mode. Thus, the commodity "lemon" can be recognized.

On the contrary, in a case in which the recognition dictionary file 30-3 is evaluated to be improper, the recognition dictionary file 30-1 before update is restored as the recognition dictionary file 30. The recognition dictionary file 30-1 is applied to the processing in the subsequent commodity recognition mode. Thus, the commodities "apple", "mandarin orange" and "cucumber" can be recognized at a high recognition rate.

On the other hand, in a case in which the user selects the low recognition commodity "lemon" as the invalidation item, the recognition dictionary file 30-1 in which the three items of commodities "apple", "mandarin orange" and "cucumber" are registered is evaluated. Since the recognition dictionary file 30-1 is already evaluated to be proper, the recognition dictionary file 30-1 is applied to the processing in the subsequent commodity recognition mode. Thus, the commodities "apple", "mandarin orange" and "cucumber" can be recognized at a high recognition rate.

In this way, in the scanner apparatus 1 according to the present embodiment, in a case in which the recognition dictionary file 30 is updated due to the addition of the recognition dictionary data 30D containing the feature amount data or the change of the feature amount data contained in the existing recognition dictionary data 30D, the validity of the updated recognition dictionary file 30 is automatically evaluated and notified. Thus, the user can determine whether or not to update the recognition dictionary file 30 easily by confirming the evaluation result.

Moreover, the user just needs to select the incorrect recognition commodity as the invalidation item in a case of determining to update the recognition dictionary file 30 and select the low recognition commodity as the invalidation item in a case of determining not to update the recognition dictionary file 30, which is convenient.

The present invention is not limited to the embodiment described above.

For example, in the embodiment described above, it is exemplified that the functions of the update apparatus and the evaluation apparatus of the recognition dictionary file are included in the scanner apparatus 1 functioning as the commodity recognition apparatus of the store checkout system. However, the present invention is not limited to this. The update and the evaluation apparatus of the recognition dictionary file may be constituted as a single body by including the functions of the update apparatus and the evaluation apparatus of the recognition dictionary file in a computer device such as a general personal computer and the like. Alternatively, a dedicated recognition dictionary evaluation apparatus may be constituted, in this case, the function of updating the recognition dictionary file is omitted and the recognition dictionary evaluation program is started when a command indicating that the recognition dictionary file is updated is input from an external device.

In the embodiment described above, it is exemplified that the commodity recognition program, the recognition dictionary update program and the recognition dictionary evaluation program are stored in the ROM 112 of the scanner apparatus 1. However, the present invention is not limited to this. At least one of the commodity recognition program, the recognition dictionary update program and the recognition dictionary evaluation program may be stored in the ROM 203 or the auxiliary storage section 205 of the POS terminal 2, and each function may be realized through the cooperation between the CPU 111 of the scanner apparatus 1 and the CPU 201 of the POS terminal 2.

Figure 8:
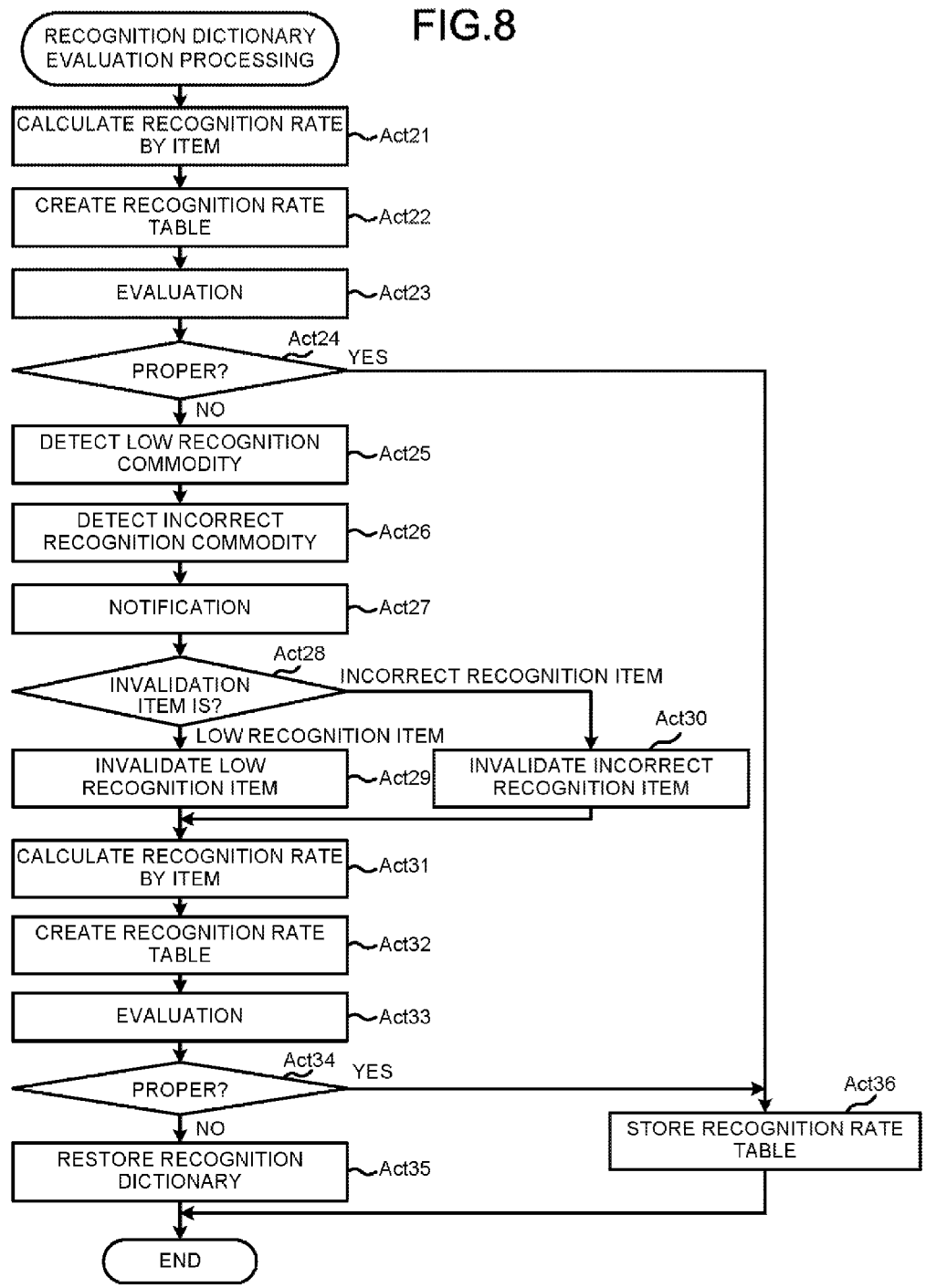
FIG. 8 is a flowchart illustrating the main procedure of a recognition dictionary evaluation processing executed by the CPU of the scanner apparatus according to a recognition dictionary evaluation program.

In the embodiment described above, it is exemplified in the processing in ACT 21 shown in FIG. 8 that a given number of feature amount data are selected from the plurality of feature amount data contained in the recognition dictionary data 30D, and the similarity degree by item is calculated individually for each of the selected feature amount data. However, the present invention is not limited to this. The similarity degree by item may be calculated individually for all the feature amount data contained in the recognition dictionary data 30D to create the recognition rate table 40T. In this way, though the processing workload of the CPU 111 is increased and more time is taken for the processing, the precision of the recognition rate by item can be improved.

In the embodiment described above, a plurality of recognition rate tables 40T is stored in the recognition rate file 40. However, the present invention is not limited to this. It is also applicable to store merely the newest recognition rate table 40T, because even in this case, the lowering width in the evaluation condition 3 or 4 can also be calculated. In a case in which the evaluation condition 3 or 4 is omitted, the recognition rate file 40 can also be omitted.

The evaluation conditions a1, a2, a3 and a4 are exemplified as the evaluation method of the recognition dictionary file 30 in the embodiment describe above, however, the evaluation conditions are not limited to these.

In addition, the transfer of the recognition dictionary evaluation apparatus is generally carried out in a state in which the recognition dictionary evaluation program is stored in the ROM. However, the present invention is not limited to this. The recognition dictionary evaluation program transferred separately from a computer device may be written in a writable storage device of the computer device through an operation of a user and the like. The transfer of the recognition dictionary evaluation program may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A recognition dictionary evaluation apparatus, comprising:
  a calculation module configured to calculate, in response to an update of a recognition dictionary file in which feature amount data indicating appearance feature amount of each commodity is stored, a recognition rate by item of each commodity according to the feature amount data of the updated recognition dictionary file;
  an evaluation module configured to evaluate the recognition dictionary file based on the recognition rate by item of each commodity calculated by the calculation module;
  a detection module configured to detect, in a case in which the recognition dictionary file is evaluated to be improper by the evaluation module, a low recognition commodity of which a correct recognition rate that a commodity is correctly recognized from all commodities is lower than a given level, and an incorrect recognition commodity of which an incorrect recognition rate is high within the recognition rate by item of the low recognition commodity; and
  a notification module configured to notify the items of the low recognition commodity and the incorrect recognition commodity detected by the detection module,
  wherein,
  the evaluation module takes at least one of the following four evaluation conditions as an evaluation condition to evaluate whether the recognition dictionary file is proper or improper:
    evaluation condition one: "whether or not the correct recognition rate of the commodity of which the recognition dictionary data is updated is greater than a first threshold value"
    evaluation condition two: "whether or not the average of the correct recognition rates of all the commodities is greater than a second threshold value"
    evaluation condition three: "whether or not a lowering width of the average of the correct recognition rates of all the commodities is lower than a third threshold value" and
    evaluation condition four: "whether or not the lowering width of the correct recognition rate of the commodity of which the recognition dictionary data is not updated is lower than a fourth threshold value".

2. The recognition dictionary evaluation apparatus according to claim 1, further comprising:

a reception module configured to receive the invalidation of either of the low recognition commodity and the incorrect recognition commodity; and an invalidation module configured to invalidate the feature amount data of the commodity of which the invalidation of recognition dictionary file is received.

3. The recognition dictionary evaluation apparatus according to claim 2, further comprising:

a re-calculation module configured to calculate the recognition rate by item of each commodity according to the feature amount data of the recognition dictionary file in a state where the feature amount data associated with the item of which the invalidation is received by the reception module is deleted from the recognition dictionary file; and a re-evaluation module configured to evaluate whether the correct recognition rate obtained for each commodity according to the recognition rate by item of each commodity calculated by the re-calculation module meets the evaluation condition.

4. The recognition dictionary evaluation apparatus according to claim 3, further comprising:

a restoration module configured to restore, when the correct recognition rate does not meet the evaluation condition, the recognition dictionary file to a state before update.

5. A recognition dictionary evaluation method, including:

calculating, in response to the update of a recognition dictionary file in which feature amount data indicating appearance feature amount of each commodity is stored, a recognition rate by item of each commodity according to the feature amount data of the updated recognition dictionary file;

evaluating the recognition dictionary file based on the recognition rate by item of each commodity calculated by the calculating;

detecting, when the recognition dictionary file is evaluated to be improper by the evaluating, a low recognition commodity of which the correct recognition rate that a commodity is correctly recognized from all commodities is lower than a given level, and an incorrect recognition commodity of which an incorrect recognition rate is high within the recognition rate by item of the low recognition commodity; and notifying the items of the low recognition commodity and the incorrect recognition commodity detected by the detection module, wherein, the evaluating takes at least one of the following four evaluation conditions as an evaluation condition to evaluate whether the recognition dictionary file is proper or improper:

evaluation condition one: "whether or not the correct recognition rate of the commodity of which the recognition dictionary data is updated is greater than a first threshold value"

evaluation condition two: "whether or not the average of the correct recognition rates of all the commodities is greater than a second threshold value"

evaluation condition three: "whether or not a lowering width of the average of the correct recognition rates of all the commodities is lower than a third threshold value" and evaluation condition four: "whether or not the lowering width of the correct recognition rate of the commodity of which the recognition dictionary data is not updated is lower than a fourth threshold value".

6. A recognition dictionary evaluation apparatus, comprising:

a memory; and a processing unit coupled to the memory that executes one or modules stored on the memory to cause the apparatus to perform operations, comprising:

calculating, in response to the update of a recognition dictionary file in which feature amount data indicating appearance feature amount of each commodity is stored, a recognition rate by item of each commodity according to the feature amount data of the updated recognition dictionary file;

evaluating the recognition dictionary file based on the recognition rate by item of each commodity calculated by the calculating;

detecting, when the recognition dictionary file is evaluated to be improper by the evaluating, a low recognition commodity of which the correct recognition rate that a commodity is correctly recognized from all commodities is lower than a given level, and an incorrect recognition commodity of which an incorrect recognition rate is high within the recognition rate by item of the low recognition commodity; and notifying the items of the low recognition commodity and the incorrect recognition commodity detected by the detection module, wherein the evaluating takes at least one of the following four evaluation conditions as an evaluation condition to evaluate whether the recognition dictionary file is proper or improper:

evaluation condition one: "whether or not the correct recognition rate of the commodity of which the recognition dictionary data is updated is greater than a first threshold value"

evaluation condition two: "whether or not the average of the correct recognition rates of all the commodities is greater than a second threshold value"

evaluation condition three: "whether or not a lowering width of the average of the correct recognition rates of all commodities is lower than a third threshold value" and evaluation condition four: "whether or not the lowering width of the correct recognition rate of the commodity of which the recognition dictionary data is not updated is lower than a fourth threshold value".

7. The recognition dictionary evaluation apparatus according to claim 1, wherein the evaluation module is configured to evaluate whether an average of correct recognition rates of all commodities is greater than a given threshold value.

8. The recognition dictionary evaluation apparatus according to claim 1, wherein the evaluation module is configured to evaluate whether an average lowering width of correct recognition rates of all commodities is lower than a given threshold value.

9. The recognition dictionary evaluation apparatus according to claim 1, wherein the evaluation module is configured to evaluate whether a lowering width of the correct recognition rate of a commodity in which the feature amount data of the recognition dictionary file is not updated is lower than a given threshold value.

* * * * *